(12) United States Patent
Xu et al.

(10) Patent No.: US 10,974,537 B2
(45) Date of Patent: Apr. 13, 2021

(54) METHOD AND APPARATUS FOR CERTIFICATE IDENTIFICATION

(71) Applicant: ADVANCED NEW TECHNOLOGIES CO., LTD., Grand Cayman (KY)

(72) Inventors: Wei Xu, Hangzhou (CN); Jidong Chen, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/879,427

(22) Filed: May 20, 2020

(65) Prior Publication Data

US 2020/0276853 A1 Sep. 3, 2020

Related U.S. Application Data

(63) Continuation of application No. PCT/CN2020/072129, filed on Jan. 15, 2020.

(30) Foreign Application Priority Data

Aug. 27, 2019 (CN) .......................... 201910796299.9

(51) Int. Cl.
*G06K 9/00* (2006.01)
*B42D 25/342* (2014.01)
*B42D 25/23* (2014.01)

(52) U.S. Cl.
CPC ........... *B42D 25/342* (2014.10); *B42D 25/23* (2014.10); *G06K 9/00355* (2013.01); *G06K 9/00382* (2013.01)

(58) Field of Classification Search
CPC combination set(s) only.
See application file for complete search history.

(56) References Cited

U.S. PATENT DOCUMENTS

| 8,094,881 B2 | 1/2012 | Matsugu et al. |
| 8,184,866 B2 | 5/2012 | Takaku et al. |

(Continued)

FOREIGN PATENT DOCUMENTS

| CN | 104504321 A | 4/2015 |
| CN | 106599772 A | 4/2017 |

(Continued)

OTHER PUBLICATIONS

First Search dated May 8, 2020, issued in related Chinese Application No. 201910796299.9 (2 pages).

(Continued)

*Primary Examiner* — Tom Y Lu

(57) ABSTRACT

A method for identifying a certification includes: determining a target verification mode for verifying a certificate, wherein the target verification mode comprises one or more pieces of movement information of movements performed by a designated body part with respect to the certificate, and the one or more pieces of movement information include information of holding the certificate in one or more designated holding postures; obtaining one or more images of the certificate; verifying whether a first image of the one or more images of the certificate comprises the designated body part; in response to that the first image comprises the designated body part, analyzing, whether the first image comprises the one or more pieces of movement information to generate an analysis result; and determining, based on the analysis result, whether the certificate is a forged certificate.

20 Claims, 7 Drawing Sheets

(56) References Cited

U.S. PATENT DOCUMENTS

| | | |
|---|---|---|
| 8,406,484 B2 | 3/2013 | Yoon et al. |
| 2007/0260886 A1 | 11/2007 | Dufour |
| 2008/0212849 A1 | 9/2008 | Gao |
| 2015/0047003 A1 | 2/2015 | Khan |
| 2018/0117946 A1* | 5/2018 | Mengel ............... B42D 25/425 |
| 2019/0251774 A1* | 8/2019 | Azanza Ladron ........ G06T 7/90 |

FOREIGN PATENT DOCUMENTS

| | | |
|---|---|---|
| CN | 106778525 A | 5/2017 |
| CN | 107679457 A | 2/2018 |
| CN | 107832679 A | 3/2018 |
| CN | 108573202 A | 9/2018 |
| CN | 108573203 A | 9/2018 |
| CN | 108629259 A | 10/2018 |
| CN | 109359502 A | 2/2019 |
| CN | 109429519 A | 3/2019 |
| CN | 110598710 A | 12/2019 |
| EP | 2784723 B1 | 10/2016 |
| ES | 2331138 T3 | 12/2009 |
| JP | 2005-202732 A | 7/2005 |
| JP | 2006-251983 A | 9/2006 |
| JP | 397437562 B2 | 9/2007 |
| JP | 2017010322 A | 1/2017 |
| KR | 10-2007-0077973 A | 7/2007 |
| KR | 10-2007-0094112 A | 9/2007 |
| KR | 10-2008-0065032 A | 7/2008 |
| KR | 10-2011-0068688 A | 6/2011 |
| KR | 10-1626880 B1 | 6/2016 |
| KR | 10-2017-0018127 A | 2/2017 |
| KR | 10-2019-104186 A | 9/2019 |
| WO | 2013-114806 A1 | 8/2013 |

OTHER PUBLICATIONS

First Office Action dated May 13, 2020, issued in related Chinese Application No. 201910796299.9, with English machine translation (22 pages).

Supplementary Search for Chinese Application No. 201910796299.9 dated Jul. 21, 2020.

* cited by examiner

METHOD AND APPARATUS FOR CERTIFICATE IDENTIFICATION

CROSS-REFERENCE TO RELATED APPLICATIONS

This application is a continuation application of International Patent Application No. PCT/CN2020/072129, filed on Jan. 15, 2020, which is based on and claims priority to and benefit of Chinese Patent Application No. 201910796299.9, filed with China National Intellectual Property Administration (CNIPA) of People's Republic of China on Aug. 27, 2019. The entire disclosures of all of the above-identified applications are incorporated herein by reference.

TECHNICAL FIELD

The specification relates to the technical field of living body detection, in particular to a method and apparatus for certificate identification.

BACKGROUND ART

Optical character recognition (OCR) of certificate characters is used extensively in identity verification scenarios, such as internet finance. OCR of certificate characters refers to processing, by the OCR technology, an image of a certificate provided by a user, in order to extract and identify the user information contained in the certificate, such as a user name, a date of birth, and an expiration date of the certificate. In a finance scenario, it is vitally important to identify any identity thefts or forgeries due to forged certificates. User behaviors of forging certificates in the black industry can be divided into two types: physical certificate forgery and electronic certificate forgery. Physical certificate forgery refers to alteration of certificate information directly on the physical copy of a certificate, including alteration of user identity information physically, for example, alteration of a name or date of birth by smearing, applying a physical patch, etc., direct fabrication of a fake certificate. Electronic certificate forgery refers to, forging information on the digitized image of the certificate obtained by digitization of a physical certificate by imaging, scanning, etc., for example, forging by Adobe Photoshop (PS) or any other image processing tool. Compared with physical certificate forgery, electronic certificate forgery has characteristics including easy access to forgery target since a certificate may be imaged directly without the need of a physical certificate, a low forgery cost, easy access to a forgery tool (i.e., Adobe Photoshop or any other image processing software), highly authentic, and prone to provoke batch attacks. Electronic services, such as internet finance, should focus on prevention from such forgeries.

SUMMARY

One or more embodiments in the specification provide a method and apparatus for certificate identification, to increase the accuracy of certificate identification and increase the cost of forging a certificate, in order to greatly reduce the probability of certificate forgery.

In order to solve the above-described technical problems, one or more embodiments the specification are implemented as follows.

In a first aspect, one or more embodiments in the specification provide a method for certificate identification. The method may comprise: by a processor, determining a target verification mode for verifying a certificate, wherein the target verification mode comprises one or more pieces of movement information of movements performed by a designated body part with respect to the certificate, and the one or more pieces of movement information include information of holding the certificate in one or more designated holding postures; obtaining one or more images of the certificate; verifying whether a first image of the one or more images of the certificate comprises the designated body part; in response to that the first image comprises the designated body part, analyzing, whether the first image comprises the one or more pieces of movement information to generate an analysis result; and determining, based on the analysis result, whether the certificate is a forged certificate.

In a second aspect, one or more embodiments in the specification provide an apparatus for certificate identification. The apparatus may comprise: a first determining module, determining a target verification mode for verifying a certificate, wherein the target verification mode comprises one or more pieces of movement information of movements performed by a designated body part with respect to the certificate, and the one or more pieces of movement information include information of holding the certificate in one or more designated holding postures; an imaging module, obtaining one or more images of the certificates; a verifying module, verifying whether a first image of the one or more images of the certificate comprises the designated body part; an analyzing module, in response to that the first image comprises the designated body part, analyzing whether the first image comprises the one or more pieces of movement information to generate an analysis result; and a second determining module, determining, based on the analysis result, whether the certificate is a forged certificate.

In a third aspect, one or more embodiments in the specification provide a device for certificate identification. The device may comprise a processor and a memory configured to store computer-executable instructions executable by the processor to cause the processor to perform operations. The operations may comprise: determining a target verification mode for verifying a certificate, wherein the target verification mode comprises one or more pieces of movement information of movements performed by a designated body part with respect to the certificate, and the one or more pieces of movement information include information of holding the certificate in one or more designated holding postures; obtaining one or more images of the certificate; verifying, whether a first image of the one or more images of the certificate comprises the designated body part; in response to that the first image comprises the designated body part, analyzing, whether the first image comprises the one or more pieces of movement information to generate an analysis result; and determining, based on the analysis result, whether the certificate is a forged certificate.

In a fourth aspect, one or more embodiments in the specification provide a non-transitory computer-readable storage medium storing computer-executable instructions executable by at least one processor to cause the at least one processor to performs operations. The operations may comprise: determining a target verification mode for verifying a certificate, wherein the target verification mode comprises one or more pieces of movement information of movements performed by a designated body part with respect to the certificate, and the one or more pieces of movement information include information of holding the certificate in one or more designated holding postures; obtaining one or more images of the certificate; verifying, whether a first image of the one or more images of the certificate comprises the designated body part; in response to that the first image comprises the designated body part, analyzing, whether the first image comprises the one or more pieces of movement information to generate an analysis result; and determining, based on the analysis result, whether the certificate is a forged certificate.

In technical solutions of embodiments in the specification, during certificate identification, instead of simply imaging the certificate to obtain an image of the certificate, the certificate is imaged according to a predetermined target verification mode, that is, based on information on movements performed by a designated body part with respect to the certificate, so that an identification result of the certificate depends not only on an image of the certificate but also on an image of a designated body part associated with the certificate. Such a mode of double verifications greatly improves the accuracy of the certificate identification. In addition, the technical solutions adopt an information input mode of inputting a designated body part and a certificate at the same time. Compared with a mode of inputting certificate information only, the technical solutions make it difficult for a forger to obtain a sample for forging the certificate, thereby increasing the difficulty of certificate forgery and reducing the probability of certificate forgery.

BRIEF DESCRIPTION OF THE DRAWINGS

To illustrate the technical solutions according to one or more embodiments in the specification or in the prior art more clearly, the accompanying drawings for describing the embodiments or the prior art are briefly introduced in the following. Apparently, the accompanying drawings in the following descriptions are only some embodiments described in one or more embodiments in the specification, and persons of ordinary skill in the art can derive other drawings from the accompanying drawings without creative efforts.

DETAIL DESCRIPTION OF EMBODIMENTS

One or more embodiments in the specification provide a method and apparatus of certificate identification, for improving the accuracy of certificate identification and increasing the cost of forging a certificate, in order to greatly reduce the probability of certificate forgery.

In order to provide those of ordinary skill in the art a better understanding, the technical solutions in one or more embodiments in the specification will be described below clearly and completely with reference to the drawings in one or more embodiments in the specification. Obviously, the described embodiments are only some embodiments, but not all embodiments, of the specification. Any embodiments obtained by those of ordinary skill in the art based on one or more embodiments in the specification without making inventive efforts fall into the protection scope of the specification.

Figure 1:
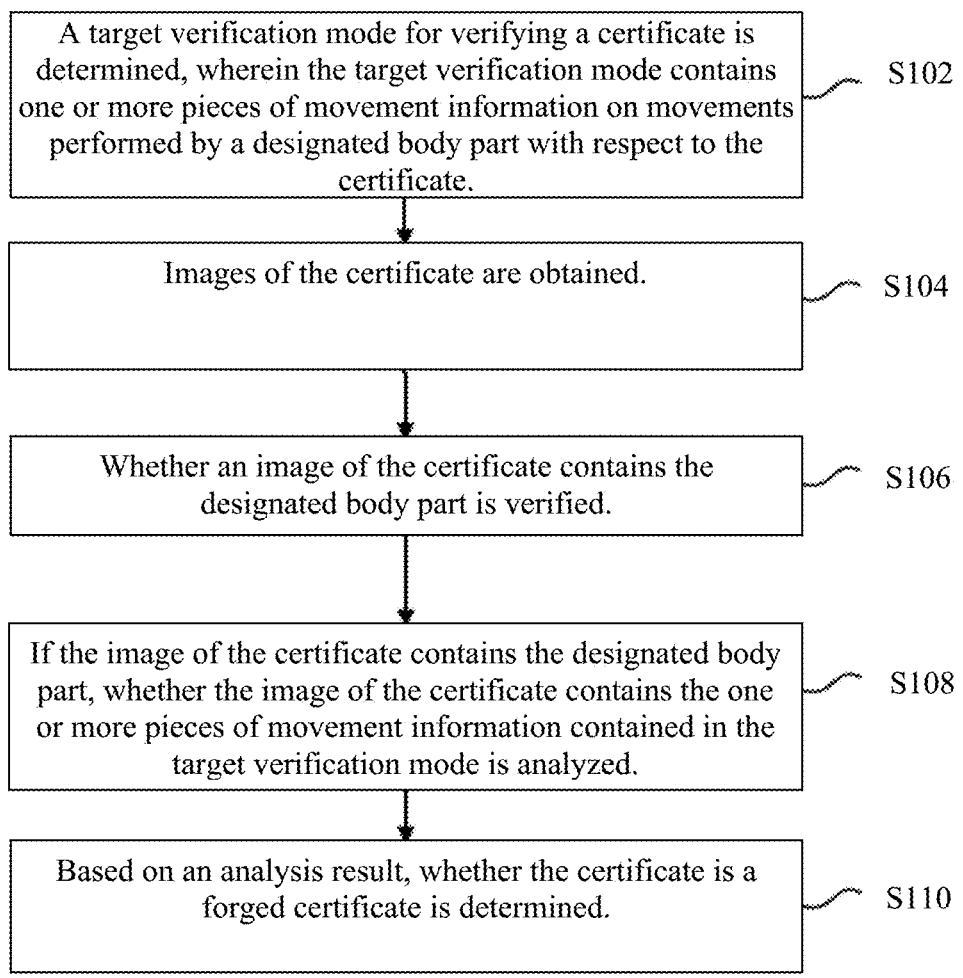
FIG. 1 is a flow chart of a method for certificate identification according to an embodiment in the specification.

FIG. 1 is a flow chart for a method for certificate identification according to an embodiment in the specification. As shown in FIG. 1, the method may comprise the following.

In S102, a target verification mode for verifying a certificate is determined, wherein the target verification mode comprises one or more pieces of movement information of movements performed by a designated body part with respect to the certificate.

In the present embodiment, a body part that is capable of performing certain movements on a certificate may be selected as the designated body part. For example, since a human hand can hold a certificate, the hand may be selected as a designated body part. When the designated body part is a human hand, the reference information of movements performed by the designated body part (i.e., a hand) on a certificate is the information of holding a certificate in a designated hand-holding posture.

After the target verification mode is determined, the target verification mode may be displayed as a text on a screen, for instructing the user to conduct the certificate identification based on one or more pieces of movement information indicated by the target verification mode.

In S104, images of the certificate are obtained, for example, by imaging.

The content of an image of the certificate may be varied depending on whether the user conducts the certificate identification according to the target verification mode. If the user conducts the certificate identification according to the target verification mode, in other words, if the user performs a movement with respect to the certificate by the designated body part and places the designated body part that performs the movement together with the certificate within a designated imaging region, then the image of the certificate is determined as an image containing the certificate and the designated body part. If the user fails to perform the certificate identification according to the target verification mode, for example, if the user only places the certificate within the designated imaging region without performing the movement with respect to the certificate by the designated body part, then the image of the certificate is determined as an image containing the certificate only.

In S106, whether an image of the certificate contains the designated body part is verified.

In S108, if the image of the certificate contains the designated body part, whether the image of the certificate contains the one or more pieces of movement information contained in the target verification mode is analyzed, and an analysis result is generated accordingly.

In S110, based on the analysis result, whether the certificate is a forged certificate is determined.

The information on movements performed by a designated body part on a certificate may include movement classes, for example, different postures correspond to different movement classes.

If the image of the certificate contains only the certificate information or contains only the designated body part, then it is determined that the certificate is a forged certificate.

If the image of the certificate does not contain the designated body part, or if the image of the certificate does not contain the one or more pieces of movement information, then it is determined that the certificate is a forged certificate.

The forged certificate in the present embodiment may be a physical forged certificate or an electronic forged certificate. A physical forged certificate refers to a forged certificate obtained by altering the certificate information directly on the physical entity of a certificate, including physically altering the user identity information (i.e., altering a name or a date of birth by smearing, applying a physical patch, etc.) or direct fabrication of a certificate. An electronic forged certificate refers to a forged certificate obtained by forging information on the image of the electronic certificate obtained by digitization of a physical certificate by imaging, scanning, etc., for example, with Adobe Photoshop (PS) or any other image processing tools.

In a technical solution of an embodiment in the specification, during certificate identification, instead of simply imaging the certificate to obtain the image of the certificate, the certificate is imaged according to a predetermined target verification mode, that is, based on the information on movements performed by the designated body part of the user with respect to the certificate. As such an identification result of the certificate depends not only on the image of a certificate but also on the image of the designated body part holding the certificate. Such a mode of double verifications greatly improves the accuracy of the certificate identification. In addition, the technical solution adopts an information input mode for inputting the designated body part and the certificate at the same time. Compared with a mode for inputting the certificate information only, the technical solution makes it difficult for a forger to obtain a sample for forging the certificate, thereby increasing the difficulty of forging the certificate and reducing the probability of certificate forgery.

In an embodiment, after the certificate is imaged to obtain the image of the certificate, a first image region of the certificate may be segmented from the image of the certificate, and whether the certificate is a forged certificate may be determined based on an image characteristic in the first image region. Thus, if it is determined that the certificate is not a forged certificate, whether the image of the certificate contains a designated body part may be further verified.

In an embodiment, image characteristics in the first image region may include a light spot characteristic, a screen moire characteristic, or a certificate rim characteristic. If an image characteristic in the first image region does not match a characteristic of a sample image, it is determined that the certificate is a forged certificate.

A characteristic of a sample image is an image characteristic in an image of a certificate obtained by imaging a certificate sample. A certificate sample is a real physical certificate, and an image characteristic in an image of the certificate sample obtained by imaging the certificate sample may have the characteristics including: a certificate rim that is not a rim of a device (i.e., a mobile phone or computer); no screen moires in the image; and light spot characteristics in the image include that the light spot is nearly circular, has a smooth and even edge and a lower brightness, and has pixels focusing towards the center, etc. Determination of whether an image characteristic in the first image region matches a characteristic of a sample image will be described in detail in the following embodiments.

When a target verification mode is to be determined for verifying a user's certificate, first, at least one verification mode may be determined from a verification mode set according to a preset method. Then, the determined at least one verification mode is set as the target verification mode for verifying the user's certificate, wherein the verification mode set contains a plurality of verification modes, and the plurality of verification modes respectively contain information on different movements performed by the designated body part with respect to the certificate.

For example, a verification mode set contains at least information on the following different movements performed by a designated body part on a certificate:

(1) holding a certificate by a hand in posture 1;
(2) holding a certificate by a hand in posture 2;
(3) holding a certificate by a hand in posture 3; and
(4) raising a certificate by a forearm in posture 4.

Based on the above-listed verification modes, when a verification mode for verifying a user's certificate is to be determined, one or more of the above-listed verification modes may be determined as the target verification mode. The preset method may be a random determination method, or a method for determining the verification mode in the order of being stored, etc.

In the present embodiment, a target verification mode may be determined from a preset verification mode set. Since the verification mode set may remain unchanged within a certain period of time, the interaction between a user and a certificate identification device may be reduced, and the cost of the interaction between the user and the certificate identification device may be balanced.

By a designated certificate detection algorithm, a first image region in which the certificate is located may be first identified in the image of the certificate, and then an image characteristic may be obtained from the first image region in which the certificate is located. The designated certificate detection algorithm may be any object detection algorithm based on deep learning, for example, a target detection algorithm like Single Shot MultiBox Detector (SSD), Region Convolutional Neural Network (R-CNN), Fast R-CNN, Faster R-CNN, etc.

After the first image region in the image of the certificate in which the certificate is located is identified by the designated certificate detection algorithm, the first image region may be segmented from the image of the certificate by any image segmentation algorithm (for example, an image semantic segmentation FCN (Fully Convolutional Network)), and the image characteristic in the first image region may be obtained. The image characteristic in the first image region may include, but is not limited to, certificate rim information (for example, whether there is a rim of a mobile phone, a computer, or any other device), whether the first image region contains any screen moires, or light spot information on the first image region.

After the image characteristic in the first image region is obtained, the image characteristic may be analyzed. Several methods for determining whether the certificate is a forged certificate by analyzing the image characteristic are described below.

Method 1:

If the image characteristic in the first image region contains the certificate rim information, then the image characteristic in the first image region may be identified by a trained first dichotomous classification algorithm. The first dichotomous classification algorithm may be obtained by training based on certificate rim characteristics of a plurality of images of the forged certificate samples and a plurality of images of the non-forged certificate samples, and output the certificate rim information. The process of training the first dichotomous classification algorithm is described as follows.

First, the fronts of a plurality of forged certificate samples are imaged to obtain the plurality of images of the forged certificate samples, and the fronts of a plurality of non-forged certificate samples are imaged to obtain the plurality of images of the non-forged certificate samples.

Forged certificate samples may include a variety of forged certificates, for example, a forged certificate that is obtained by physical alteration of user identity information (for example, alteration of a name or date of birth by smearing, applying a physical patch, etc.), direct fabrications, or a color printout of a-certificate, or an electronic forged certificate obtained by forging information on the image of an electronic certificate obtained by digitizing a physical certificate via imaging, scanning, etc.

Second, a first rim characteristic of the images of the forged certificate samples and a second rim characteristic of the images of the non-forged certificate samples are obtained by analyzing the certificate rim information of each image of the forged certificate sample and certificate rim information of each image of non-forged certificate sample, respectively.

Third, the first dichotomous classification algorithm is obtained by learning based on the first rim characteristic and the second rim characteristic.

In method 1, the certificate rim information corresponding to an image of the forged certificate and the certificate rim information corresponding to an image of the non-forged certificate may be different. Specifically, if the forged certificate is an electronic forged certificate obtained by falsifying information on the image of the electronic certificate obtained by digitization of a physical certificate via imaging, scanning, etc., and since the electronic forged certificate is shown on a computer screen or mobile phone screen, the rim of the image of the forged certificate obtained by imaging is the rim of the computer screen or the rim of the mobile phone screen, while the image of the non-forged certificate contains no rim of a computer screen or that of a mobile phone screen. Therefore, method 1 is applicable to the identification of an electronic forged certificate.

If the result of the identification of the image characteristic by the first dichotomous classification algorithm shows that the certificate has a rim of a device, for example, a mobile phone or a computer, then it is directly determined that the certificate is a forged certificate. If the result of the identification of the image characteristic by the first dichotomous classification algorithm shows that the certificate has no device rim, then whether the certificate is a forged certificate is further determined in combination with another method (for example, by analyzing first movement information of a designated body part with respect to the certificate).

Method 2:

If the image characteristic in the first image region contains information on whether the first image region contains any screen moires, then the image characteristic in the first image region may be identified by a trained second dichotomous classification algorithm. The second dichotomous classification algorithm is obtained by training based on screen moire characteristics of a plurality of images of forged certificate samples and a plurality of images of non-forged certificate samples, and outputs a screen moire characteristic, such as whether there is any screen moire. The training process is described as follows.

First, the fronts of a plurality of forged certificate samples are imaged to obtain a plurality of images of forged certificate samples, and the fronts of a plurality of non-forged certificate samples are imaged to obtain a plurality of images of non-forged certificate samples.

Forged certificate samples may include a variety of forged certificates, for example, a forged certificate that is obtained by physical alteration of the user identity information (for example, alteration of a name or date of birth by smearing, applying a physical patch, etc.), direct fabrications, or a color printout of a certificate, or an electronic forged certificate obtained by falsifying information on the image of the electronic certificate that is obtained by digitization of a physical certificate via imaging, scanning, etc.

Second, a first screen moire characteristic of the plurality of images of forged certificate samples and a second screen moire characteristic of the plurality of images of non-forged certificate samples are obtained by analyzing the screen moire characteristic of each image of the forged certificate sample and the screen moire characteristic of each image of the non-forged certificate sample, respectively.

Third, a second dichotomous classification algorithm may be obtained by learning based on the first screen moire characteristic and the second screen moire characteristic.

In method 2, a screen moire characteristic corresponding to an image of the forged certificate and a screen moire characteristic corresponding to an image of the non-forged certificate may be different. Specifically, if the forged certificate is an electronic forged certificate obtained by falsifying information on the image of the electronic certificate that is obtained by digitization of a physical certificate via imaging, scanning, etc., and since the electronic forged certificate is shown on a computer screen or mobile phone screen, the image of the forged certificate obtained by imaging has a screen moire. However, the image of the non-forged certificate has no screen moire. Therefore, method 2 is applicable to the identification of an electronic forged certificate.

If the result of the identification of the image characteristic by the second dichotomous classification algorithm shows that the image of the certificate has a screen moire, then it is directly determined that the certificate is a forged certificate. If the result of the identification of the image characteristic by the second dichotomous classification algorithm shows that the image has no screen moire, then whether the certificate is a forged certificate is further determined in combination with another method, for example, by analyzing first movement information of a designated body part with respect to the certificate.

Method 3:

If the image characteristic in the first image region contains light spot information on the first image region, then the image characteristic in the first image region may be identified by a trained third dichotomous classification algorithm. The third dichotomous classification algorithm may be obtained by training based on light spot characteristics on a plurality of images of forged certificate samples and a plurality of images of non-forged certificate samples, and output the light spot characteristics on the images. The process of training the third dichotomous classification algorithm is described as follows.

First, in a flash environment, the fronts of a plurality of forged certificate samples are imaged to obtain a plurality of images of forged certificate samples, and the fronts of a plurality of non-forged certificate samples are imaged to obtain a plurality of images of non-forged certificate samples.

Forged certificate samples may include a variety of forged certificates, for example, a forged certificate that is obtained by physical alteration of the user identity information (for example, alteration of a name or date of birth by smearing, applying a physical patch, etc.), direct fabrications, or a color printout a certificate, or an electronic forged certificate obtained by falsifying information on the image of the electronic certificate that is obtained by digitization of a physical certificate via imaging, scanning, etc.

In method 3, since only an image taken in a flash environment may contain a light spot, the image of a sample should be taken in a flash environment. The flash environment may be an environment in which a mobile terminal takes an image with its flashlight on or may be an imaging environment created by a specialized imaging flashlight.

Second, a first light spot in each image of forged certificate sample and a second light spot in each image of non-forged certificate sample may be identified.

Third, the characteristic of each first light spot may be analyzed to obtain a first light spot characteristic of the images of the forged certificate samples, and the characteristic of each second light spot may be analyzed to obtain a second light spot characteristic of the images of non-forged certificate samples.

Fourth, a third dichotomous classification algorithm may be obtained by learning based on the first light spot characteristic and the second light spot characteristic.

Figure 2A:
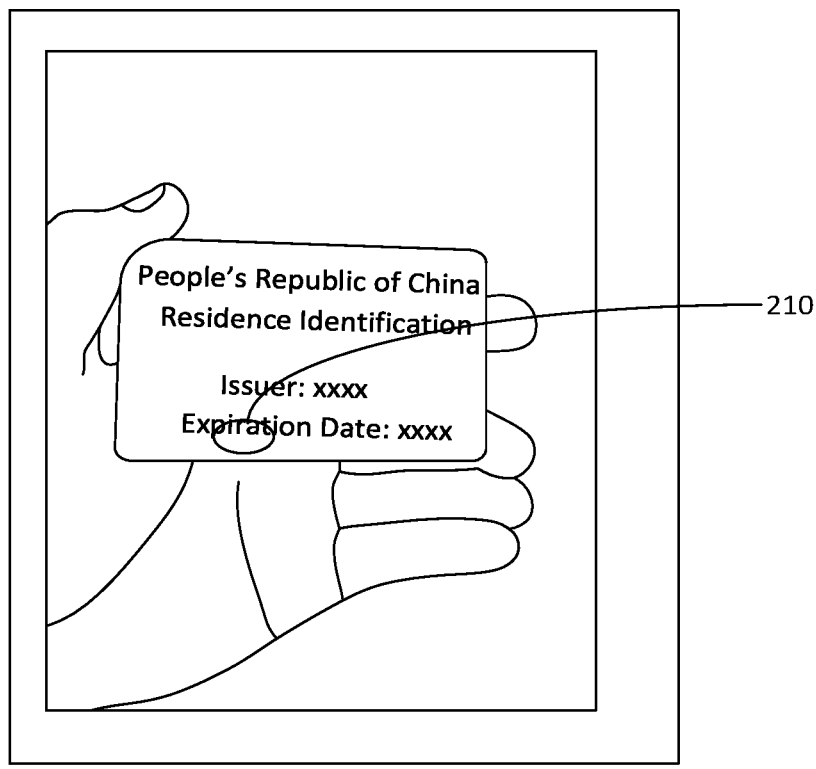
FIGS. 2A-2B are images of certificates used in a method for certificate identification according to an embodiment in the specification.
Figure 2B:
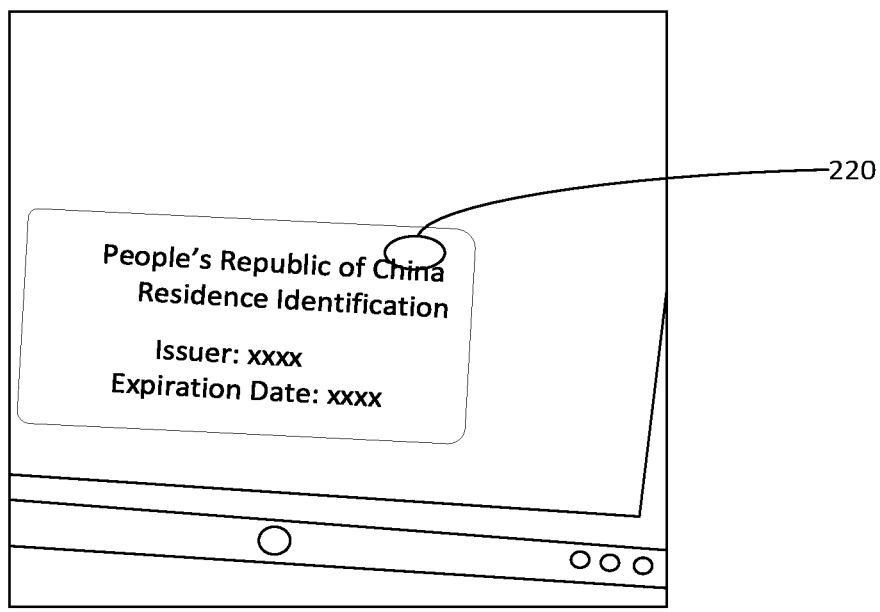

In method 3, both the image of the forged certificate and the image of the non-forged certificate taken in a flash environment may contain light spots, and the light spots are markedly different from each other. FIGS. 2A-2B respectively show, the image of the forged certificate and the image of the non-forged certificate that are taken in a flash environment. FIG. 2A shows an image of the non-forged certificate taken in a flash environment, and FIG. 2B shows an image of the forged certificate taken in a flash environment. As shown in the figures, the light spot 210 on the image of the non-forged certificate has the following characteristic (namely, the second light spot characteristic of the image of the non-forged certificate sample): the light spot is nearly circular, has a smooth and even edge and a lower brightness, and pixels on the light spot focusing towards the center, etc. The light spot 220 on the image of the forged certificate has the following characteristic (that is, the first light spot characteristic of the image of the forged certificate sample): the light spot is radially shaped or star-shaped, has an irregular edge, stretched in all directions (for example, up and down, or left and right), has a higher brightness, etc. Therefore, the third dichotomous classification algorithm may be trained and obtained by learning based on the characteristic difference between light spots on images of the forged certificates and light spots on images of the non-forged certificates.

If the result of the identification of the image characteristic by the third dichotomous classification algorithm shows that the light spot characteristic on the image of the certificate is the same as the light spot characteristic on the image of the forged certificate sample, then it may be directly determined that the certificate is a forged certificate. If the result of the identification of the image characteristic by the third dichotomous classification algorithm shows that the light spot characteristic on the image of the certificate is different from the light spot characteristic on the image of the forged certificate sample, or that the light spot characteristic on the image of the certificate is the same as the light spot characteristic on the image of the non-forged certificate sample, then whether the certificate is a forged certificate is further determined in combination with another method, for example, by analyzing the movement information of a designated body part with respect to the certificate.

Three methods have been described above for determining whether a certificate is a forged certificate by analyzing the image characteristic. In an actual application, different image characteristics may be identified by using the above-described three types of dichotomous classification algorithms, respectively, or by using a dichotomous classification algorithm that is trained by a combination of a plurality of dichotomous classification algorithms to be able to identify a plurality of image characteristics concurrently. For example, a deep learning may be performed based on a combination of a first dichotomous classification algorithm and a second dichotomous classification algorithm. In other words, the learning is performed concurrently based on a screen moire characteristic and based on a certificate rim characteristic of the plurality of images of the forged certificate sample and the plurality of images of the non-forged certificate samples. The data output from a dichotomous classification algorithm obtained by the training is used as the certificate rim information and the screen moire characteristic of the images of the certificates.

Each piece of information on a movement performed by the designated body part on the certificate may correspond to a first movement class. Thus, when analyzing whether the image of the certificate contains the one or more pieces of movement information that is comprised in the target verification mode, a second image region in which the designated body part is located may be first identified from the image of the certificate by a designated body part detection algorithm. Then, by a trained movement classification algorithm, body movements in the second image region may be classified to obtain one or more second movement classes of the user with respect to the certificate. The movement classification algorithm may be obtained based on a plurality of pieces of sample movement information of different classes of a designated body part on a certificate. The sample movement information may include sample movement classes. If at least one second movement class is inconsistent with the corresponding first movement class, then it is determined that the image of the certificate does not contain the one or more pieces of movement information.

In the present embodiment, the body part detection algorithm may be any object detection algorithm based on deep learning, for example, a target detection algorithm like SSD, R-CNN, Fast R-CNN, Faster R-CNN, etc. After the designated body part is identified by the body part detection algorithm, the second image region in which the designated body part is located may be segmented from the image of the certificate by any image segmentation algorithm, for example, an image semantic segmentation FCN. Then the movement information in the second image region may be analyzed.

Figure 3A:
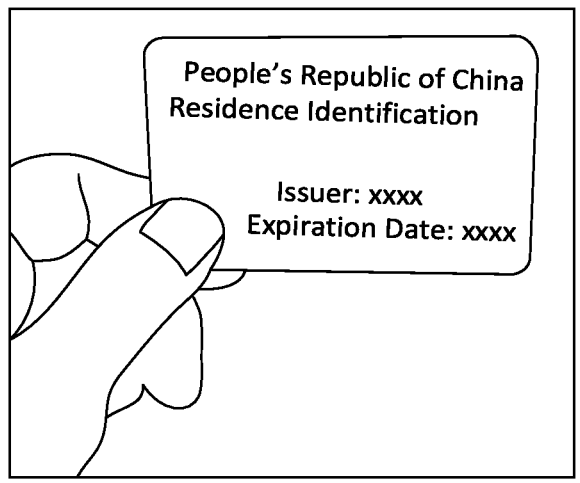
FIGS. 3A-3C are images of certificates used in a method for certificate identification according to another embodiment in the specification.
Figure 3B:
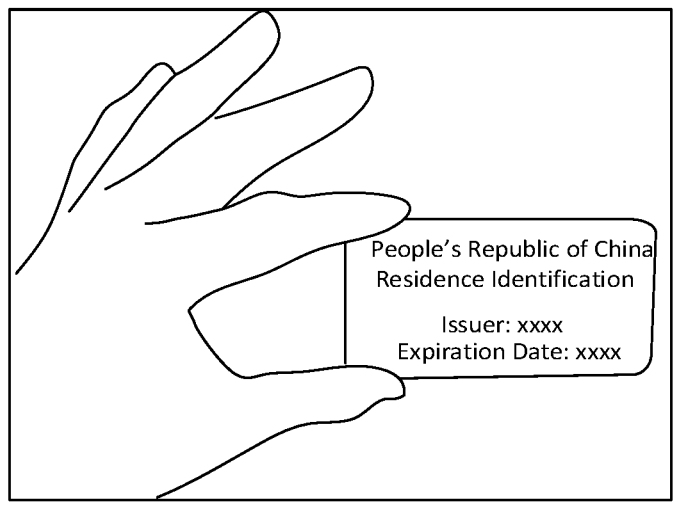
Figure 3C:
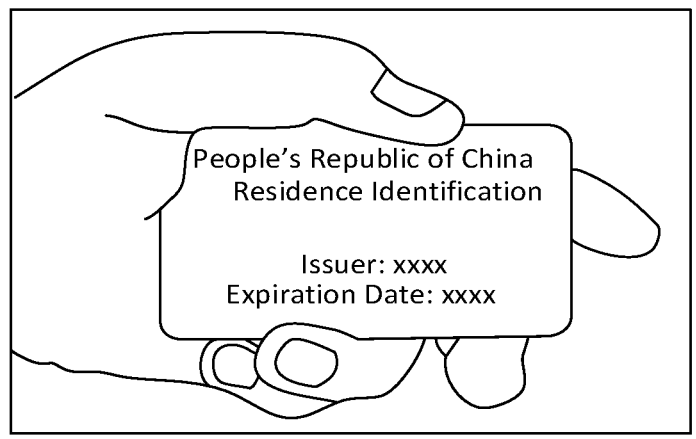

For example, the designated body part is a human hand, and the information on the one or more movements performed by the designated body part on the certificate is the information of holding the certificate in one or more designated hand-holding postures. Assuming that the sample movement classes may comprise three classes of sample hand-holding postures as shown in FIGS. 3A-3C and a class of "no hand", a quartering classification algorithm may be trained based on the sample movement information corresponding to each sample movement class to be able to identify the hand-holding posture in which the human hand holds the certificate.

The process of training the quartering classification algorithm may comprise the following steps.

First, images of sample hand gestures corresponding to a plurality of sample hand-holding postures and images of the sample certificates of "no hand" are collected. The images of sample hand gestures are shown in FIGS. 3A-3C. The image of sample certificate of "no hand" does not contain the designated body part.

Second, the images of sample hand gestures and the images of sample certificates of "no hand" are identified by a hand gesture identification algorithm to obtain sample movement information corresponding to each sample hand-holding posture and sample movement information corresponding to each sample certificate of "no hand".

The hand gesture identification algorithm may detect an angle, a spatial location, contours, or other information of each joint of a human body part, for example, a hand, a face, or an arm. In the present embodiment, since the designated body part is a human hand, the hand gesture identification algorithm may detect an angle, a spatial location, contours, and other information of each finger in the images of the sample hand gestures for generating the sample movement information. The details of the process of detecting a human body part by a hand gesture identification algorithm may comprise any detection technologies and is not described herein.

Third, the quartering classification algorithm is obtained by learning based on the sample movement information corresponding to each sample hand-holding posture and the sample movement information corresponding to each sample certificate of "no hand".

In the present embodiment, if a first movement class corresponding to one or more pieces of information on movements performed by a designated body part on a certificate is consistent with one or more second movement classes performed by the user with respect to the certificate, it is determined that the image of the certificate contains the one or more pieces of movement information. If at least one first movement class corresponding to the one or more pieces of information on movements performed by the designated body part on the certificate is inconsistent with the one or more second movement classes performed by the user with respect to the certificate, it is determined that the image of the certificate does not contain the one or more pieces of movement information.

Assuming that the first movement class is reference hand-holding postures shown in FIGS. 3A-3C, whether a hand-holding posture of a designated body part with respect to the certificate is consistent with the reference hand-holding postures may be determined. If they are consistent, it is determined that the first movement class is consistent with the second movement class. If they are inconsistent, it is determined that the first movement class is inconsistent with the second movement class.

Figure 4:
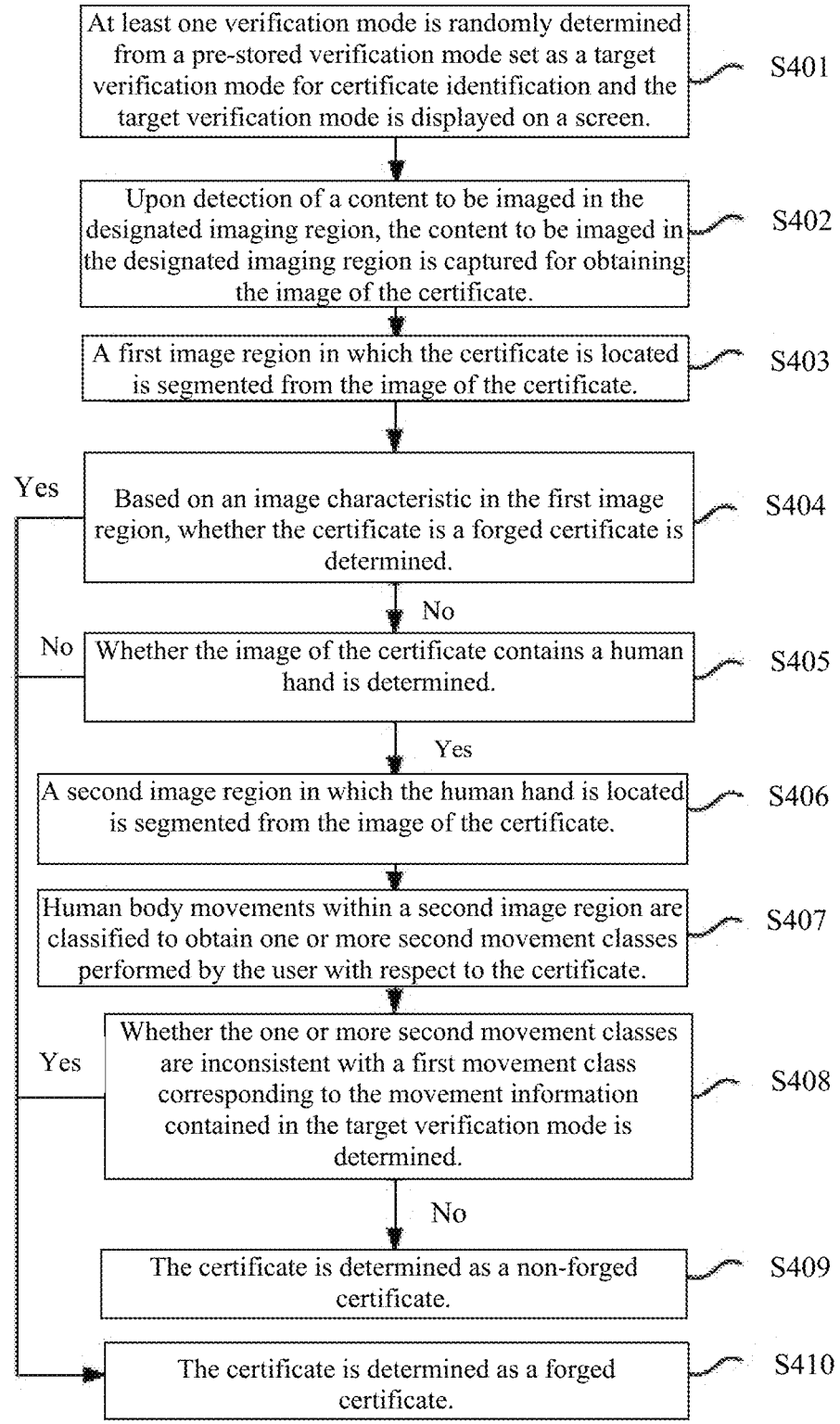
FIG. 4 is a flow chart for a method for certificate identification according to another embodiment in the specification.

FIG. 4 is a flow chart for a method for certificate identification according to another embodiment in the specification. In the embodiment, the designated body part is a human hand, and the information on one or more movements performed by the designated body part on the certificate is the information of holding the certificate in one or more designated hand-holding postures by a hand. As shown in FIG. 4, the method is applicable to a terminal device that has a function of the certificate identification, and comprises the following steps.

In S401, at least one verification mode is randomly determined from a pre-stored verification mode set as a target verification mode for the certificate identification, and the at least one target verification mode is displayed on a screen.

The verification mode set may include a plurality of verification modes, and each verification mode refers to a mode of holding a certificate in a plurality of designated hand-holding postures. In the present embodiment, each verification mode is a mode of holding the certificate in the three reference hand-holding postures shown in FIGS. 3A-3C.

Figure 5:
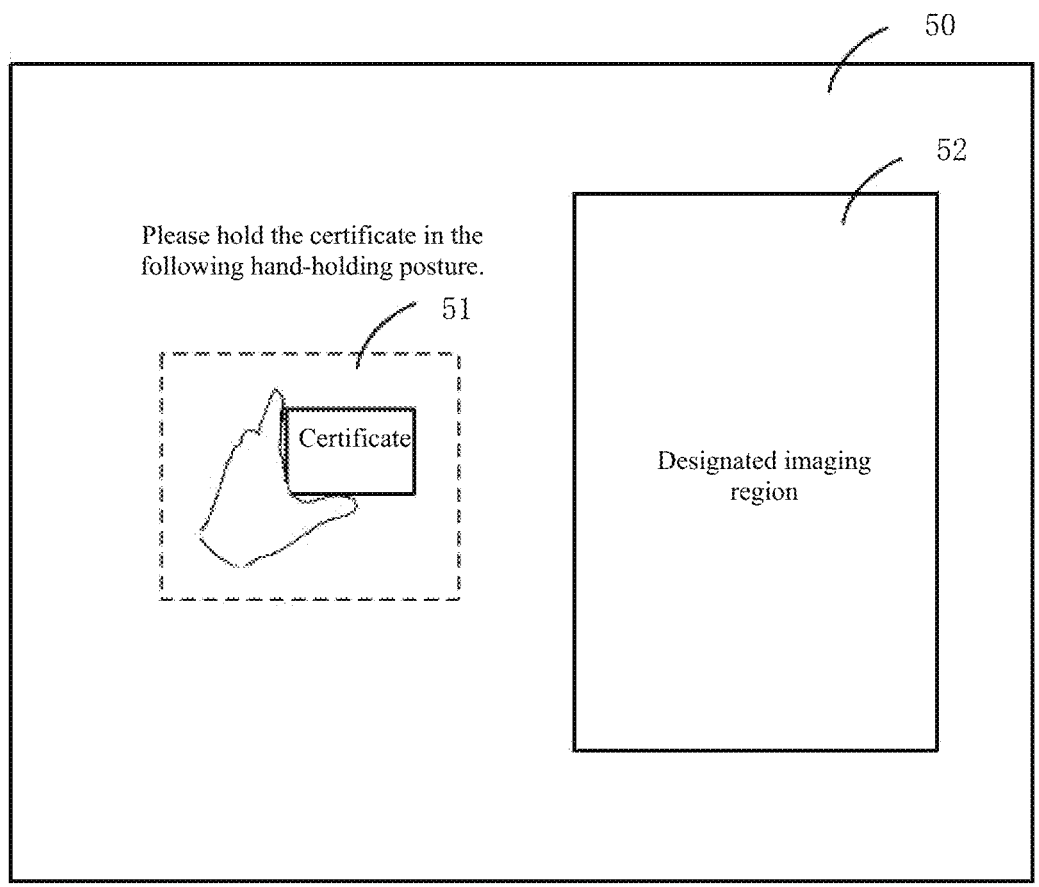
FIG. 5 is a schematic diagram of an interface for certificate identification in a method for certificate identification according to an embodiment in the specification.

After determining the target verification mode, the terminal device may display the target verification mode on a screen, for instructing the user to hold the certificate in the reference hand-holding posture indicated by the target verification mode, and place the hand and the certificate together within a designated imaging region. FIG. 5 is a schematic diagram of an interface for displaying the target verification mode on a terminal device. The target verification mode comprises a reference hand-holding posture for holding a certificate by a hand. As shown in FIG. 5, the terminal device may display a text of "Please hold the certificate in the following hand-holding posture" on a screen 50, and display an image (or as a GIF file) of the reference hand-holding posture within a screen region 51 on the screen 50, for instructing the user to hold the certificate in the reference hand-holding posture displayed within the screen region 51 and place the hand and the certificate together within a designated imaging region 52. Noticeably, the position of the reference hand-holding posture and the position of the designated imaging region on the screen as shown in FIG. 5 are only exemplary. In the actual application, the position of the reference hand-holding posture and the position of the designated imaging region on the screen may be adjusted as needed.

In S402, upon detection of a content to be imaged in the designated imaging region, the content to be imaged in the designated imaging region is captured for obtaining the image of the certificate.

In this step, the obtained image of the certificate may contain only the certificate or may contain the certificate and the human hand holding the certificate.

In S403, a first image region in which the certificate is located is segmented from the image of the certificate.

In S404, based on an image characteristic in the first image region, whether the certificate is a forged certificate may be determined. If the certificate is not determined as a forged certificate, proceed to S405. If the certificate is determined as a forged certificate, proceed to S410.

In S405, whether the image of the certificate contains a human hand is determined. If the image of the certificate contains a human hand, proceed to S406. If the image of the certificate contains no human hand, proceed to S410.

In S406, a second image region in which the human hand is located is segmented from the image of the certificate.

In the above-described steps, the region in which the certificate and human hand are located may be detected by any object detection algorithm based on deep learning, for example, a target detection algorithm like SSD, R-CNN, Fast R-CNN, Faster R-CNN, etc. Then the region in which the certificate and human hand are located may be segmented from the image of the certificate by any image segmentation algorithm, for example, an image semantic segmentation FCN.

An image characteristic may include, but is not limited to, a certificate rim characteristic (for example, whether there is a rim of a mobile phone, a computer, or any other device), whether the first image region contains any screen moires, or a light spot characteristic of the first image region.

An image characteristic in the first image region may be compared with a characteristic of a sample image. If they match with each other, it is determined that the certificate is not a forged certificate. If they do not match with each other, it is determined that the certificate is a forged certificate. The image characteristic in the first image region does not match the characteristic of the sample image may include, but are not limited to, the following cases: the certificate in the image has a rim of a device (i.e., a rim of a mobile phone or computer); the first image region contains a screen moire; or the light spot characteristic on the first image region is the same as the light spot characteristic of a forged certificate.

In S407, human body movements within a second image region are classified to obtain one or more second movement classes performed by the user with respect to the certificate.

In S408, whether the one or more second movement classes are inconsistent with a first movement class corresponding to the movement information contained in the target verification mode is determined. If they are consistent, proceed to S409. If they are inconsistent, proceed to S410.

In S409, the certificate is determined as a non-forged certificate.

In S410, the certificate is determined as a forged certificate.

Further, in the present embodiment, when S401 is performed, if a plurality of verification modes are determined from the verification mode set, the plurality of verification modes may be displayed in sequence. After a first verification mode is displayed and the image of the certificate is captured according to the first verification mode, the next verification mode may be displayed, and another image of the certificate is captured according to the next verification mode. Thus, the terminal device may obtain a plurality of images of the certificate by imaging the content within the designated imaging region and analyze the plurality of images of the certificate respectively to obtain a plurality of analysis results. If each of the analysis results shows that the certificate is not a forged certificate, then it may be determined that the certificate is not a forged certificate. If at least one analysis result shows that the certificate is a forged certificate, then it may be determined that the certificate is a forged certificate.

In the present embodiment, at least one verification mode is determined from the preset verification mode set, and the user is instructed to conduct the certificate identification according to the determined at least one verification mode. This eliminates the need for the terminal device to collect a large number of verification modes or for a user to keep leaning new verification modes, thereby balancing the cost of the interaction between the user and the terminal device. Further, in the present embodiment, a certificate may be identified jointly based on the information on the postures of holding the certificate by a human hand and the certificate information, so that an identification result of the certificate depends not only on the image of the certificate but also on the image of a human hand associated with the certification. Such a mode of double verifications greatly improves the accuracy of the certificate identification. In addition, the technical solution adopts an information input mode of inputting a designated human hand and a certificate at the same time, which, compared with a mode of inputting certificate information only, makes it difficult for a forger to obtain a sample for forging the certificate, thereby increasing the difficulty of certificate forgery and reducing the probability of certificate forgery.

One or more embodiments of the specification have been described above. Other embodiments may fall within the scope defined by the attached claims. In certain cases, the actions described in the claims may be performed in a different sequence and a desired result may still be achieved. Further, the processes illustrated in the drawings do not necessarily require indication of a specific sequence or a continuous sequence in order to achieve the desired result. In certain embodiments, multitasking or parallel processing may be favorable.

A method for certificate identification provided in one or more embodiments in the specification has been described above. Based on the same idea, one or more embodiments in the specification may further provide a certificate identification apparatus.

Figure 6:
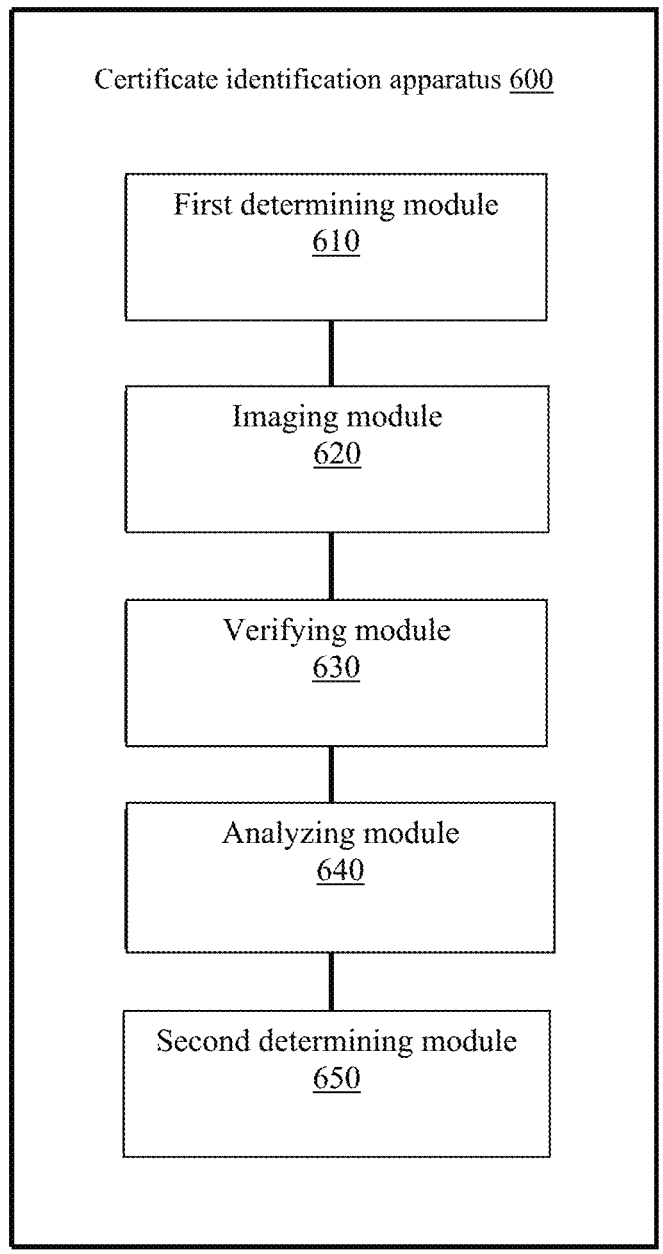
FIG. 6 is a schematic block diagram for an apparatus for certificate identification according to an embodiment in the specification.

FIG. 6 is a schematic block diagram of an apparatus for certificate identification according to an embodiment in the specification. As shown in FIG. 6, the certificate identification apparatus 600 comprises: a first determining module 610, for determining a target verification mode for verifying a certificate, wherein the target verification mode contains one or more pieces of information on movements performed by a designated body part with respect to the certificate; an imaging module 620, for obtaining one or more images of the certificate; a verifying module 630, for verifying whether an image of the certificate contains the designated body part; an analyzing module 640, for analyzing whether the image of the certificate contains the one or more pieces of movement information and generating an analysis result, when the image of the certificate contains the designated body part; and a second determining module 650, for determining, based on the analysis result, whether the certificate is a forged certificate.

The apparatus 600 further comprises: a segmenting module, for segmenting a first image region in which the certificate is located from the image of the certificate, before verifying whether the image of the certificate contains the designated body part; and a third determining module, for determining, based on an image characteristic in the first image region, whether the certificate is a forged certificate.

The verifying module 630 comprises a verifying unit, for further verifying whether the image of the certificate contains the designated body part, when the certificate is not determined as a forged certificate based on the image characteristic.

An image characteristic includes at least one of a light spot characteristic, a screen moire characteristic, or a certificate rim characteristic.

The third determining module comprises: a first determining unit, for determining that the certificate is a forged certificate, if the image characteristic does not match a characteristic of a sample image. The sample image characteristic is an image characteristic in an image of the certificate obtained by imaging a sample certificate.

The first determining module 610 comprises: a second determining unit, for determining at least one verification mode from a verification mode set by a preset method, and setting the at least one determined verification mode as a target verification mode for verifying a certificate of the user. Wherein a verification mode set contains a plurality of verification modes, and the plurality of verification modes respectively contain information on different movements performed by a designated body part with respect to the certificate.

The apparatus 600 further comprises a fourth determining unit, for determining that the certificate is a forged certificate, if the image of the certificate does not contain the designated body part, or if the image of the certificate does not contain one or more pieces of movement information.

Each piece of movement information corresponds to a different first movement class.

The analyzing module 640 comprises: an identifying unit, for identifying a second image region where the designated body part is located on the image of the certificate; a classifying unit, for classifying a body movement in the second image region to obtain one or more second movement classes of the user with respect to the certificate by a trained movement classification algorithm, wherein the trained movement classification algorithm is obtained based on a plurality of pieces of sample movement information of different classes of a designated body part on a certificate; and a third determining unit, for determining that the image of the certificate does not contain one or more pieces of movement information if at least one of the second movement classes is inconsistent with the corresponding first movement class.

A designated body part includes a human hand, and the information on one or more movements performed by the designated body part on a certificate includes the information on holding the certificate in one or more designated hand-holding postures.

With an apparatus in an embodiment in the specification, during the certificate identification, instead of simply imaging the certificate to obtain an image of the certificate, the certificate is imaged according to a predetermined target verification mode (that is, based on information on movements performed by a designated body part of a user with respect to the certificate), so that an identification result of the certificate depends not only on the image of the certificate but also on an image of a designated body part associated with the certificate. Such a mode of double verifications greatly improves the accuracy of certificate identification. In addition, the apparatus adopts an information input mode of inputting the designated body part and the certificate at the same time. Compared with a mode of inputting certificate information only, the apparatus makes it difficult for a forger to obtain a sample for forging the certificate, thereby increasing the difficulty of certificate forgery and reducing the probability of certificate forgery.

Those of ordinary skill in the art may understand that the above-described apparatus may be used to implement the above certificate identification method. Since a detailed description of the apparatus is similar to the corresponding description of the above method, similar description will not be repeated herein.

Figure 7:
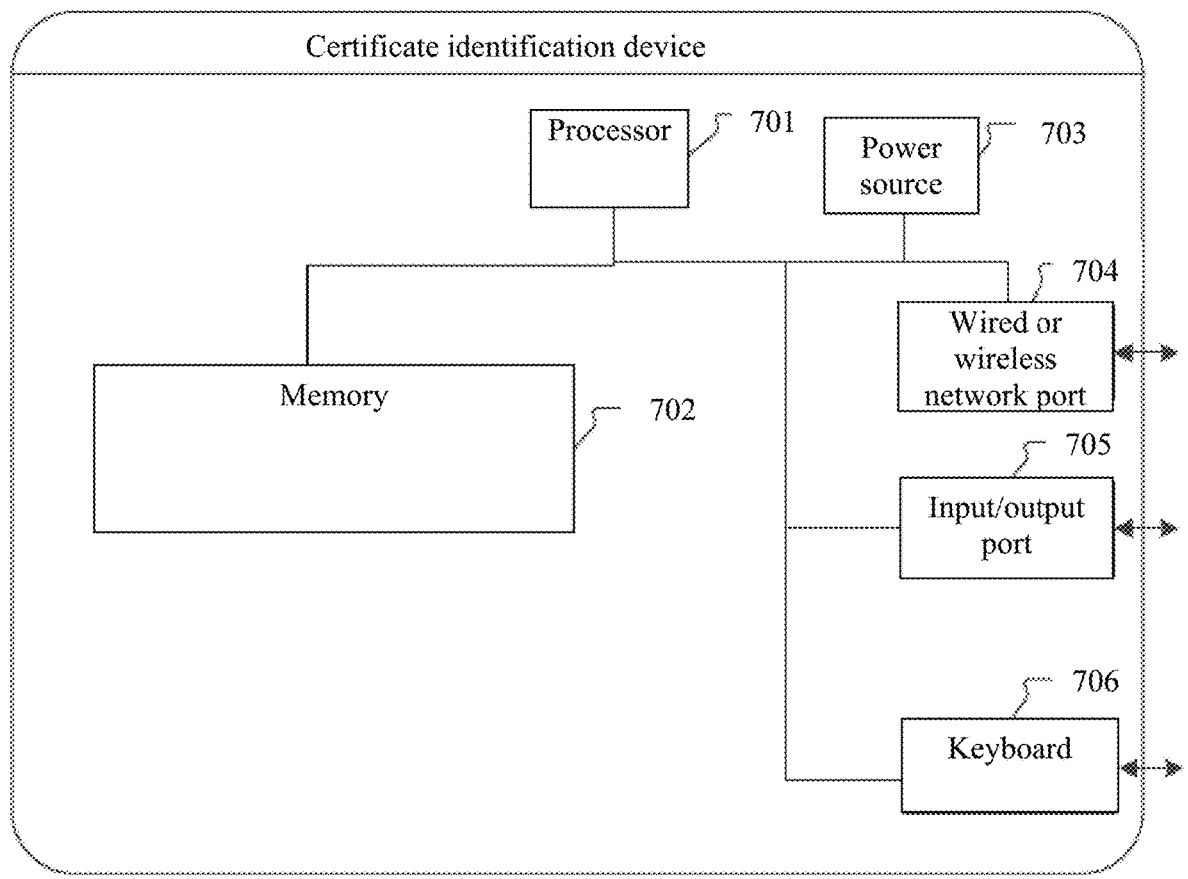
FIG. 7 is a schematic block diagram for a device for certificate identification according to an embodiment in the specification.

Based on the same idea, one or more embodiments in the specification further provide a certificate identification device, as shown in FIG. 7. Certificate identification devices may be varied greatly with configurations or performances. A certificate identification device may comprise one or more processors 701 and a memory 702. The memory 702 may store one or more application programs or pieces of data. The memory 702 may comprise a transient storage or a permanent storage. An application program stored in the memory 702 may comprise one or more modules (not shown in the figure), and each module may comprise a series of computer-executable instructions for the certificate identification device. Further, the processor 701 may be configured to communicate with the memory 702 and execute the series of computer-executable instructions stored in the memory 702 on the certificate identification device. The certificate identification device may further comprise one or more power sources 703, one or more wired or wireless network ports 704, one or more input/output ports 705, and one or more keyboards 706.

In the present embodiment, the certificate identification device comprises a memory and one or more programs, wherein the one or more programs are stored in the memory. The one or more programs may comprise one or more modules. Each module may comprise a series of computer-executable instructions on the certificate identification device, and be configured for execution of the one or more programs by the one or more processors, including execution of the following computer-executable instructions: determining a target verification mode for verifying a certificate, wherein the target verification mode contains one or more pieces of movement information on movements performed by a designated body part on the certificate; obtaining one or more images of the certificate; verifying whether an image of the certificate contains the designated body part; if the image contains the designated body part, analyzing whether the image of the certificate contains the one or more pieces of movement information and generating an analysis result; and determining, based on the analysis result, whether the certificate is a forged certificate.

The computer-executable instruction, when executed, further causes the processor to: before verifying whether the image of the certificate contains the designated body part, segment a first image region in which the certificate is located from the image of the certificate; and determine, based on an image characteristic in the first image region, whether the certificate is a forged certificate.

The computer-executable instruction, when executed, further causes the processor to: when it is determined, based on the image characteristic, that the certificate is not a forged certificate, further verify whether the image of the certificate contains the designated body part.

The image characteristic includes at least one of a light spot characteristic, a screen moire characteristic, or a certificate rim characteristic.

The computer-executable instruction, when executed, further causes the processor to:

if the image characteristic does not match a characteristic of a sample image, determine that the certificate is a forged certificate, the characteristic of a sample image being an image characteristic in an image of the certificate obtained by imaging a sample certificate.

The computer-executable instruction, when executed, further causes the processor to:

determine at least one verification mode from a verification mode set by a preset method; and set the at least one determined verification mode as a target verification mode for verifying a certificate of a user, wherein the verification mode set contains a plurality of verification modes, and the plurality of verification modes respectively contain information on different movements performed by the designated body part on the certificate.

The computer-executable instruction, when executed, further causes the processor to: if the image of the certificate does not contain the designated body part, or if the image of the certificate does not contain the one or more pieces of movement information, determine that the certificate is a forged certificate.

Each piece of the movement information corresponds to a different first movement class.

The computer-executable instruction, when executed, further causes the processor to: identify, from the image of the certificate, a second image region where the designated body part is located; by a pre-trained movement classification algorithm, classify body movements in the second image region to obtain one or more second movement classes of the user for the certificate, wherein the movement classification algorithm is obtained based on a plurality of pieces of sample movement information of different classes of a designated body part on a certificate; if at least one of the second movement classes is inconsistent with the corresponding first movement class, determine that the image of the certificate does not contain the one or more pieces of movement information.

The designated body part includes a human hand, and the information on one or more movements performed by the designated body part on the certificate includes information of holding the certificate in one or more designated hand-holding postures.

One or more embodiments in the specification further provide a computer-readable storage medium. The computer-readable storage medium stores one or more programs, and the one or more programs comprise instructions. The instructions comprising a plurality of application programs, when executed by an electronic device, cause the electronic device to execute the above-described certificate identification method, and is used to: determine a target verification mode for verifying a certificate, wherein the target verification mode contains one or more pieces of information on movements performed by a designated body part on the certificate; obtain one or more images of the certificate; verify whether an image of the certificate contains the designated body part; if the image contains the designated body part, analyze whether the image of the certificate contains the one or more pieces of movement information and generate an analysis result; and determine, based on the analysis result, whether the certificate is a forged certificate.

The system, apparatus, module, or unit explained in the above-described embodiments may be implemented by a computer chip or entity, or may be implemented by a product that has certain functions. A typical implementation device comprises a computer. Specifically, for example, the computer may be a personal computer, a laptop computer, a cellular phone, a camera phone, a smartphone, a personal digital assistant, a media player, a navigation device, an e-mail device, a game console, a tablet PC, a wearable device, or a combination thereof.

For convenience of description, the above apparatus is divided into different units by functions, which are described separately. Certainly, in the implementation of one or more embodiments in the specification, the functions of each unit may be implemented by the same piece or a plurality of pieces of software and/or hardware.

Those of ordinary skill in the art should understand that one or more embodiments in the specification may be provided as a method, a system, or a computer program product. Therefore, one or more embodiments in the specification may be in the form of a whole hardware embodiment, a whole software embodiment, or combination of software and hardware. In addition, one or more embodiments in the specification may be in the form of a computer program product designed for implementation on one or more computer-usable storage media (including, but not limited to, disk memories, CD-ROMs, and optical memories) that comprise computer-usable program codes.

One or more embodiments in the specification are described with reference to the flow charts and/or block diagrams for the methods, devices (systems), and computer program products of the embodiments in the specification. It should be understood that each flow and/or block in the flow charts and/or block diagrams, and a combination of the flows and/or blocks in the flow charts and/or block diagrams may be implemented by computer program instructions. These computer program instructions may be provided to a processor in a general computer, a special computer, an embedded processor, or any other programmable data processing device to generate a machine, so that, by an instruction executed by a processor in a computer or any other programmable data processing device, an apparatus may be generated and used to implement the functions designated in one or more flows in a flow chart and/or one or more blocks in a block diagram.

These computer program instructions may also be stored in a computer-readable memory that may lead a computer or any other programmable data processing device to work in a specific manner, so that, by instructions stored in the computer-readable memory, a product comprising an instruction device may be generated. The instruction device implements the functions designated in one or more flows in a flow chart and/or one or more blocks in a block diagram.

These computer program instructions may also be loaded into a computer or any other programmable data processing device, so that a series of operating steps are executed on a computer or any other programmable data processing device for the computer to generate processes. Thus, by an instruction executed by a computer or any other programmable data processing device, steps are provided and performed to implement the functions designated in one or more flows in a flow chart and/or one or more blocks in a block diagram.

In a typical configuration, a computer device comprises one or more processors (CPUs), input/output ports, network ports, and memories.

A memory may be in the form of a non-permanent memory, a Random Access Memory (RAM), and/or a non-volatile memory, which are computer-readable media including a Read-Only Memory (ROM) or a flash RAM. A memory is an example of a computer-readable medium.

Computer-readable media may be permanent or non-permanent, movable or immovable media, and may implement information storage by any method or technology. Information may be a computer-readable instruction, a data structure, a module of a program, or other data. Examples of storage medium for computers may include, but are not limited to, phase-change memory (PRAM), Static Random-Access Memory (SRAM), Dynamic Random Access Memory (DRAM), any other type of Random-Access Memory (RAM), read-only memory (ROM), Electrically Erasable Programmable Read-Only Memory (EEPROM), Flash memory or any other memory technology, Compact Disc Read-Only Memory (CD-ROM), Digital Versatile Disk (DVD) or any other optical storage, cassette, magnetic tape, magnetic disk, or any other magnetic storage device or any other non-transmission medium, which may be used for storing information that may be accessed by a computing device. According to the definition given herein, computer-readable media do not include any transitory computer-readable media (transitory media), for example, modulated data signals and carriers.

Also noticeably, terms "comprise", "contain", or any variants thereof cover nonexclusive inclusion, so that a process, method, commodity, or device that comprises a series of elements not only includes those elements, but also includes other elements that are not expressly listed, or further includes elements that are inherent in such a process, method, commodity, or device. Without further limitations, for an element limited by the statement "comprises a . . . ", the process, method, commodity, or device may include that element, and another identical element.

One or more embodiments in the specification may be described in the general context of a computer-executable instruction executed by a computer, for example, a program module. Generally, a program module includes a routine, a program, an object, a component, a data structure, etc. for executing a specific task or implementing a specific abstract data type. Alternatively, one or more embodiments in the specification may be implemented in distributed computing environments. In such distributed computing environments, tasks are performed by remote processing devices connected by a communication network. In a distributed computing environment, a program module may be located in a local or remote computer storage medium, including a storage device.

Each embodiment in the specification have been described in a progressive manner, and same or similar components in each embodiment may be referred to each other. The description of each embodiment focuses on its differences from other embodiments. In particular, a system embodiment, which is basically similar to a method embodiment, may be described briefly, and components of the system may be referred to relevant descriptions of the method embodiment.

While one or more embodiments in the specification have been described in detail above, the described embodiments are not intended to limit the specification. It is apparent to those of ordinary skill the art that various alterations and changes may be made to one or more embodiments in the specification. Any modifications, equivalent replacements, improvements, etc. made without departing from the spirit or principle of one or more embodiments in the specification shall fall into the scope defined by the claims of one or more embodiments in the specification.

What is claimed is:

1. A method, comprising:
   determining, by a processor, a target verification mode for verifying a certificate, wherein the target verification mode comprises one or more pieces of movement information of movements performed by a designated body part with respect to the certificate, and the one or more pieces of movement information include information of holding the certificate in one or more designated holding postures;
   obtaining, by the processor, one or more images of the certificate;
   verifying, by the processor, whether a first image of the one or more images of the certificate comprises the designated body part;
   in response to that the first image comprises the designated body part, analyzing, by the processor, whether the first image comprises the one or more pieces of movement information to generate an analysis result, wherein the designated body part comprises a hand, and the analyzing comprises:
      detecting an angle, a spatial location, and contours of each finger of the hand in the first image; and
      determining whether the first image comprises the one or more pieces of movement information based on the angle, the spatial location, and the contours of each finger of the hand in the first image; and
   determining, by the processor based on the analysis result, whether the certificate is a forged certificate.

2. The method of claim 1, further comprising:
   before the verifying whether a first image of the one or more images of the certificate comprises the designated body part:
   segmenting, from the first image, a first image region in which the certificate is located; and
   determining, based on an image characteristic in the first image region, whether the certificate is a forged certificate.

3. The method of claim 2, further comprising:
   in response to determining that the certificate is not a forged certificate based on the image characteristic, verifying whether the first image comprises the designated body part.

4. The method of claim 2, wherein
   the image characteristic includes at least one of a light spot characteristic, a screen moire characteristic, or a certificate rim characteristic; and
   the determining, based on an image characteristic in the first image region, whether the certificate is a forged certificate comprises:
      in response to that the image characteristic does not match a characteristic of a sample image, determining that the certificate is a forged certificate, wherein the characteristic of the sample image comprises an image characteristic in an image of the certificate obtained by imaging a sample certificate.

5. The method of claim 1, wherein the determining a target verification mode for verifying a certificate comprises:
   determining at least one verification mode from a verification mode set according to a preset method; and
   determining the at least one verification mode as the target verification mode for verifying the certificate of a user;
   wherein the verification mode set comprises a plurality of verification modes, and each of the plurality of verification modes respectively comprises movement information of different movements performed by the designated body part with respect to the certificate.

6. The method of claim 1, further comprising:
   in response to that the first image does not comprise the designated body part, or that the first image does not comprise the one or more pieces of movement information, determining that the certificate is a forged certificate.

7. The method of claim 1, wherein
   each of the one or more pieces of the movement information corresponds to a different first movement class; and
   the analyzing whether the first image comprises the one or more pieces of movement information comprises:
      identifying, from the first image, a second image region where the designated body part is located;
      classifying, by a trained movement classification algorithm, body movements in the second image region to obtain one or more second movement classes of the user with respect to the certificate, wherein the trained movement classification algorithm is obtained based on a plurality of pieces of sample movement information of different classes of a designated body part with respect to a certificate; and
      in response to that at least one of the one or more second movement classes is inconsistent with a corresponding first movement class, determining that the first image does not comprise the one or more pieces of movement information.

8. A device, comprising:
   a processor; and
   a memory, configured to store computer-executable instructions executable by the processor to cause the processor to perform operations including:
   determining a target verification mode for verifying a certificate, wherein the target verification mode comprises one or more pieces of movement information of movements performed by a designated body part with respect to the certificate, and the one or more pieces of movement information include information of holding the certificate in one or more designated holding postures;

obtaining one or more images of the certificate;

verifying whether a first image of the one or more images of the certificate comprises the designated body part;

in response to that the first image comprises the designated body part, analyzing whether the first image comprises the one or more pieces of movement information to generate an analysis result, wherein the designated body part comprises a hand, and the analyzing comprises:

detecting an angle, a spatial location, and contours of each finger of the hand in the first image; and determining whether the first image comprises the one or more pieces of movement information based on the angle, the spatial location, and the contours of each finger of the hand in the first image; and determining, based on the analysis result, whether the certificate is a forged certificate.

9. The device of claim 8, wherein the operations further comprise:

before the verifying whether a first image of the one or more images of the certificate comprises the designated body part:

segmenting, from the first image, a first image region in which the certificate is located; and determining, based on an image characteristic in the first image region, whether the certificate is a forged certificate.

10. The device of claim 9, wherein the operations further comprise:

in response to determining that the certificate is not a forged certificate based on the image characteristic, verifying whether the first image comprises the designated body part.

11. The device of claim 9, wherein the image characteristic includes at least one of a light spot characteristic, a screen moire characteristic, or a certificate rim characteristic; and the determining, based on an image characteristic in the first image region, whether the certificate is a forged certificate comprises:

in response to that the image characteristic does not match a characteristic of a sample image, determining that the certificate is a forged certificate, wherein the characteristic of the sample image comprises an image characteristic in an image of the certificate obtained by imaging a sample certificate.

12. The device of claim 8, wherein the determining a target verification mode for verifying a certificate comprises:

determining at least one verification mode from a verification mode set according to a preset method; and determining the at least one verification mode as the target verification mode for verifying the certificate of a user;

wherein the verification mode set comprises a plurality of verification modes, and each of the plurality of verification modes respectively comprises movement information of different movements performed by the designated body part with respect to the certificate.

13. The device of claim 8, wherein the operations further comprise:

in response to that the first image does not comprise the designated body part, or that the first image does not comprise the one or more pieces of movement information, determining that the certificate is a forged certificate.

14. The device of claim 8, wherein each of the one or more pieces of the movement information corresponds to a different first movement class; and the analyzing whether the first image comprises the one or more pieces of movement information comprises:

identifying, from the first image, a second image region where the designated body part is located;

classifying, by a trained movement classification algorithm, body movements in the second image region to obtain one or more second movement classes of the user with respect to the certificate, wherein the trained movement classification algorithm is obtained based on a plurality of pieces of sample movement information of different classes of a designated body part on a certificate; and in response to that at least one of the one or more second movement classes is inconsistent with a corresponding first movement class, determining that the first image does not comprise the one or more pieces of movement information.

15. A non-transitory computer-readable storage medium storing computer-executable instructions executable by at least one processor to cause the at least one processor to performs operations including:

determining a target verification mode for verifying a certificate, wherein the target verification mode comprises one or more pieces of movement information of movements performed by a designated body part with respect to the certificate, and the one or more pieces of movement information include information of holding the certificate in one or more designated holding postures;

obtaining one or more images of the certificate;

verifying whether a first image of the one or more images of the certificate comprises the designated body part;

in response to that the first image comprises the designated body part, analyzing whether the first image comprises the one or more pieces of movement information to generate an analysis result, wherein the designated body part comprises a hand, and the analyzing comprises:

detecting an angle, a spatial location, and contours of each finger of the hand in the first image; and determining whether the first image comprises the one or more pieces of movement information based on the angle, the spatial location, and the contours of each finger of the hand in the first image; and determining, based on the analysis result, whether the certificate is a forged certificate.

16. The non-transitory computer-readable storage medium as claimed of claim 15, wherein the operations further comprise:

before the verifying whether a first image of the one or more images of the certificate comprises the designated body part:

segmenting, from the first image, a first image region in which the certificate is located; and determining, based on an image characteristic in the first image region, whether the certificate is a forged certificate.

17. The non-transitory computer-readable storage medium as claimed in claim 16, wherein the operations further comprise:

in response to determining that the certificate is not a forged certificate based on the image characteristic, verifying whether the first image comprises the designated body part.

18. The non-transitory computer-readable storage medium as claimed in claim 16, wherein
the image characteristic includes at least one of a light spot characteristic, a screen moire characteristic, or a certificate rim characteristic; and
the determining, based on an image characteristic in the first image region, whether the certificate is a forged certificate comprises:
in response to that the image characteristic does not match a characteristic of a sample image, determining that the certificate is a forged certificate, wherein the characteristic of the sample image comprises an image characteristic in an image of the certificate obtained by imaging a sample certificate.

19. The non-transitory computer-readable storage medium as claimed in claim 15, wherein the determining a target verification mode for verifying a certificate comprises:
determining at least one verification mode from a verification mode set according to a preset method; and
determining the at least one verification mode as the target verification mode for verifying the certificate of a user;
wherein the verification mode set comprises a plurality of verification modes, and each of the plurality of verification modes respectively comprises movement information of different movements performed by the designated body part with respect to the certificate.

20. The non-transitory computer-readable storage medium as claimed in claim 15, wherein the operations further comprise:
in response to that the first image does not comprise the designated body part, or that the first image does not comprise the one or more pieces of movement information, determining that the certificate is a forged certificate.

\* \* \* \* \*